Oct. 7, 1958 A. C. RUGE 2,855,489
LOAD CELL
Filed Dec. 12, 1955
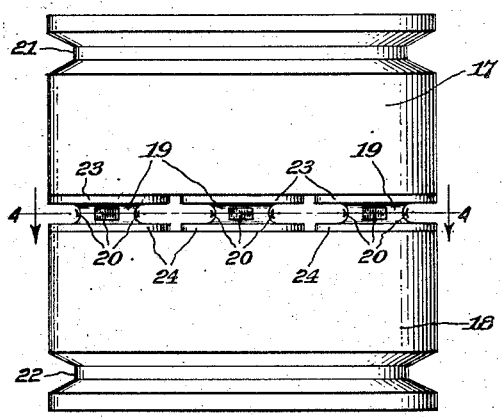
FIG. 3
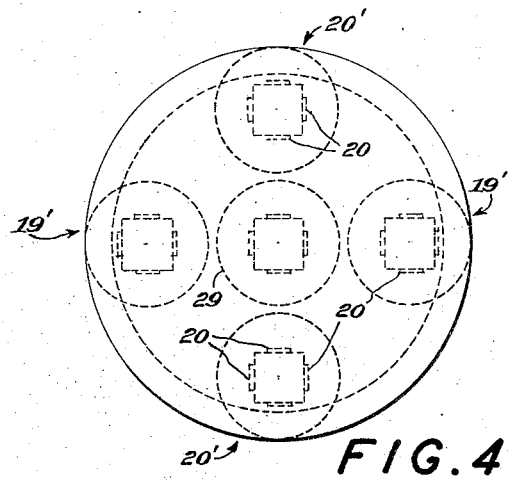
FIG. 4
FIG. 2
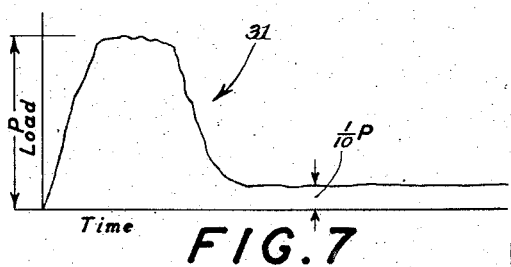
FIG. 7
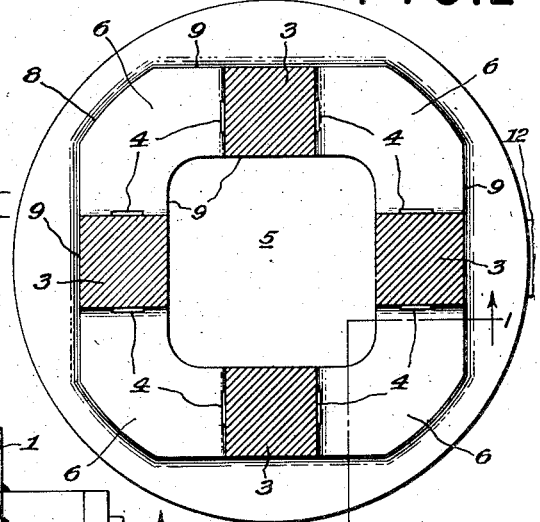
FIG. 5
FIG. 6
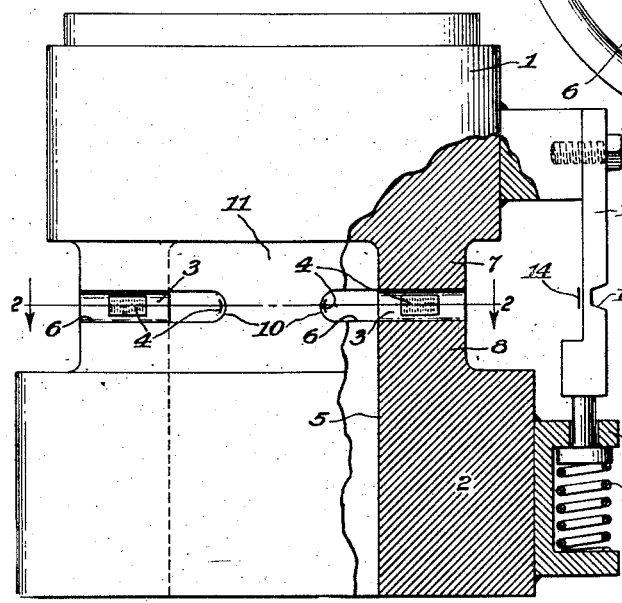
FIG. 1
INVENTOR.
ARTHUR C. RUGE
BY
ATTORNEY

United States Patent Office 2,855,489
Patented Oct. 7, 1958

2,855,489

LOAD CELL

Arthur C. Ruge, Lexington, Mass., assignor to Baldwin-Lima-Hamilton Corporation, a corporation of Pennsylvania Application December 12, 1955, Serial No. 552,585

9 Claims. (Cl. 201—48)

This invention relates generally to load cells and more particularly to high-frequency load measuring cells that are especially adapted to employ bonded-wire type electrical resistance strain gages.

It is an object of the present invention to provide an electrical load-sensing device, or "load cell," which gives a minimum deflection in response to load while at the same time providing an output in response to load which is sufficiently large to make precise measurements practical by existing electrical measuring equipment. Another object is to provide a load cell which is very compact while at the same time being capable of sustaining large eccentricity of load and large side load in a construction which is both simple and economical to produce. A further object is to provide a large output in a load cell having a very high safety factor against mechanical failure.

While my invention is applicable wherever load or force is to be measured, its significance is more apparent in the example of testing rocket motors, particularly those of the solid-propellant type, wherein the rocket is fired with its nose supported against a load-sensing device which is normally mounted on a massive steel and concrete abutment so as to provide as rigid a support as possible. It is of great importance in the rocket art to measure the "rise time" which represents the rate at which the thrust is built up to its maximum value immediately following ignition.

In a moderately large rocket which weighs several hundred pounds, the thrust may for example reach a maximum of 50,000 pounds and the rise time is such that 90 percent of this maximum thrust may be reached in the vicinity of three or four milliseconds. In the case of smaller rockets, the rise time is much shorter but this difficulty is offset somewhat by the smaller mass involved.

In such a problem of force measurement it is readily seen that any deflection of the thrust-measuring system, including its foundations, will of necessity result in distortion of the thrust-time pattern and hence errors in calculating the rise time and total impulse. Load cells which have been used in the past for this service, while extremely rigid by ordinary standards, exhibit deflection of .005 to .010" under full load. This load cell deflection when added to other deflections in the load-supporting system are known to produce distortions in the thrust-time function which are unacceptably large at the present stage of development of the rocket art.

It has been found that a load cell built in accordance with the principles of the present invention satisfies the above stated objects to a remarkable degree. In a 20,000 pound capacity load cell which was very generously proportioned as to size, the diameter and height were only 3", the deflection under rated capacity load was not over .0005". The cell was found to be remarkably insensitive to eccentricity of load far beyond the limits that could conceivably occur in rocket practice, and its ability to resist side load without appreciable error in thrust measurement was at least equal to the best load cells of current conventional design, although the construction of the new load cell was by comparison extremely simple and economical. In addition, the electrical output of the cell was found to be equal to that of conventional load cells which give as much as ten to twenty times the deflection, are larger, and more complicated and costly.

Other objects and advantages will be more apparent to those skilled in the art from the following description of the accompanying drawings in which:

Fig. 1 is a side elevation of an integral form of my load cell, partly broken away along a line 1—1 of Fig. 2;

Fig. 2 is a section taken on the line 2—2 of Fig. 1;

Fig. 3 is a side elevation of a modified form of cell that is particularly adapted for measuring loads of an impact nature;

Fig. 4 is a plan view of Fig. 3;

Fig. 5 is a plan view of a rectangular form of load sensing device;

Fig. 6 is an edge view of Fig. 5; and

Fig. 7 is a typical two-level rocket curve showing the relationship of load forces to be measured.

Fig. 1 shows an embodiment of the present invention in the form of a load cell of integral construction, designed for very small axial deflection, extreme rigidity and strength against eccentric, torsional, and side loads, and for economy of manufacture. For a 50,000 pound rated capacity cell the diameter of element 1 was made 3½ inches while the height was 4½ inches, these dimensions being greatly in excess of what was needed for strength but in this particular design extreme rigidity was the prime consideration. The construction comprises a circular load receiving member 1, load transmitting and sensing members 3, and a circular base 2. To facilitate forming the sensing elements 3 an axial hole 5 of generally rectangular cross section extends from the bottom of base 2 to the lower side of member 1. Narrow horizontal slots 6 are cut through the intermediate portion of the cell thereby forming upper and lower solid annular-like portions 7 and 8 connected by the short block-like sensing elements 3. The portions 7 and 8 are conveniently made somewhat square in plan view with vertical inner and outer flat surfaces 9. Where extreme rigidity and high accuracy are both required, receiving member 1 and base 2 are made very thick axially so that load transmitted to sensing elements 3 is relatively independent of the distribution of load applied to the upper and lower surfaces of the cell and so that the contribution of the receiving member and the base to the total deflection is minimized.

The load-transmitting and -sensing elements 3 are seen to be a multiplicity of very short connecting block-like elements preferably rectangular in cross-section and which in the specific 50,000 pound illustration are only ¼" high, each having two sharply-curved concave opposite sides 10 of ⅛" radius on which are placed strain-sensing means 4 such, for example, as the well-known bonded wire strain gage. The elements 3, for the capacity referred to, are approximately 0.7" square, thus emphasizing the decided flat-block character of these elements. Sensing means 4 serves to measure the strain on the curved surface of elements 3 in a lengthwise or axial direction in response to applied load in the axial direction of the load cell.

This design may use any desired number of sensing elements 3 specifically shown as four in number and symmetrically spaced about the longitudinal axis of the cell for purposes of illustration. As a matter of manufacturing convenience, only two of the faces of the sensing element 3 are made curved to receive strain gages 4 while the remaining two surfaces are uncurved in the vertical direction as they are part of the flat surfaces 9. In another case I might make all of the surfaces curved, as will be seen later.

The function of the curved faces of element 3 is to provide a deliberate concentration of stress on its surface, this being diametrically opposite to the function of conventionally used columns, such as shown in many load cell patents of which my Patent No. 2,488,348 is illustrative, which expressly avoid a stress concentration because of well known so-called "end effects." Therefore, columns in their functional and structural sense were employed in such cells. However, in my present invention I have found that stress concentrations can be effectively produced and employed by eliminating the use of columns and instead providing short blocks with sharply-curved sides so that the measurement of strain at this point provides a measuring output which is considerably larger for a given load than would be provided by measuring the average strain in the load-transmitting element. In the design shown in Fig. 1, using bonded wire strain gages having a gage length which was short relative to the length of the curved face, e. g., only ⅓ thereof, it was found that the strain measured by gages 4 was approximately three times the average strain in element 3. Thus it is seen that I achieve a relatively high output while preserving a maximum degree of rigidity of the load cell in its axial direction. Furthermore, I provide a large output in a load cell having a very high safety factor. This is particularly important in such applications as rocket thrust measurement since the thrust forces can accidently become a great deal higher than would be expected in normal operation of the rocket. Since the average stress in my transmitting elements 3 needs to be only about one-third as great as in a conventional type of cell for a given output in response to load, and since the stress concentration will not lead to failure of the cell in compression even though the surface strain becomes exceedingly high, it is seen that the safety factor of such a cell is at least three times as high as the safety factor of a column-type cell made of the same material and having the same output. The same is true compared with the well known ring-shaped sensing element. Even if overloaded in tension my improved cell will have a high safety factor if the material of elements 3 possesses a fair degree of ductility.

Another means of measuring the load in the type of cell shown in Fig. 1 consists of any means responsive to the relative motion between elements 1 and 2. At first it might be thought that since the average stress in element 3 is kept low to minimize deflection and provide additional safety, that the deflection between elements 1 and 2 might be too small for convenient measurement. However, the total relative motion between these elements is considerably greater than would be calculated by considering only the deflection in the short length of element 3 at its average stress. This is because the metal in regions 11 adjacent to elements 3 undergoes total strains which are as large as or larger than the total strain in element 3 itself. As a result, it is practical to measure the load in terms of the relative motion between elements 1 and 2. Any type of motion-responsive means may be used, but a preferred form is illustrated in Fig. 1 since it is highly responsive and relatively simple to make. For example, an element 12 having a reduced section 13 is rigidly attached to member 1 by welding or other suitable rigid connecting means and is also rigidly attached, at least within a certain load limit as will be presently described, to member 2 so that any relative motion between these elements is transmitted directly to element 12. Since the reduced section 13 is made very much smaller in cross section than the remainder of element 12, it is clear that the greater part of the total deflection between elements 1 and 2 will appear as a highly concentrated strain at section 13 which is readily measured by a strain-responsive element such as a bonded wire strain gage 14. As a practical matter, there preferably would be two or more elements 12 symmetrically spaced around the load cell and connected so as to measure the average or sum of their outputs in order to minimize the possibility of error due to eccentric or side loading on the cell. While member 12 can be directly secured to member 2, yet as shown in Fig. 1, the lower end of member 12 may be provided with a collar biased by a preloaded spring 15 into contact with a bracket 16 which is secured to member 2. The preload force of spring 15 is such that element 12, in effect, is held immovably fixed to member 2 during low loads applied to member 1, but goes out of action at high loads imposed thereon. Sensing means 12 thereby provides an extremely sensitive indication of low loads, with sensing means 4 providing indication of higher loads, i. e. gages 4 record at lower sensitivity for full loading range. The curve 31 of Fig. 7 shows that in the case of a rocket the maximum load force P is followed by a smaller load force which is desired to be measured with the same percentage accuracy as the maximum load P.

It will be seen that the particular sensing means just described carries a small part of the total load on the cell. However, this is immaterial and, as a practical matter, the area at section 13 is made so small that the element 12 primarily serves as a motion-sensing means rather than a significant load-carrying element.

By making reduced section 13 very short I can produce a great magnification of strain in gage 14 and thus obtain an even greater output than I can get from gages 4 on element 3, the cell design and loading being the same. However, if the cell should be subject to great overload the worst that can happen is that I will damage the measuring element 12 which can readily be replaced, or I can arrange the attachment of element 12 so that it becomes inoperative when a certain load is exceeded, to prevent impairing its measuring function. Thus, I can achieve a very large sensitivity to load without sacrificing safety or accuracy.

Fig. 3 shows an embodiment of the present invention especially adapted for high-frequency load measurement where the loading speeds involved may be thought of as impact loading. For such work, it is necessary to bring the rigidity of the cell up to the very highest value possible while still retaining sufficient output to make accurate measurement possible. The load cell shown in Fig. 3 was designed for 20,000 pound capacity with output great enough to make it practical to measure accurately at 1/10 of capacity load so that accurate two-level rocket testing could be performed under conditions of extremely short rise time.

The essential difference between Fig. 1 and Fig. 3 is that Fig. 3 is in the nature of a composite structure whereas the cell of Fig. 1 is made from a solid piece of material. A load-receiving element 17 and a base 18 are connected by load-transmitting block-like elements 19. Preferably, the assembly is soldered or brazed together so as to obtain the benefits of an integral construction. One great advantage of the construction of Fig. 3 is that it permits the designer to employ different materials for the different parts of the cell. Another is that it results in a simpler machining and strain gaging operation. In the case of the rocket testing cell referred to, elements 17 and 18 were actually made of a tungsten carbide composition having a Young's modulus of 90 million p. s. i. This material is completely unmachinable. The load-transmitting elements 19 were made of a hardened tool steel having a Young's modulus of approximately 30 million p. s. i. The entire assembly was oven brazed together. The reason for using tungsten carbide is that it greatly reduces the overall deflection of the cell which results from the "sinking in" of the transmitting elements into the load receiving and base elements, as was referred to in the discussion of regions 11 of Fig. 1. Tungsten carbide reduces this effect by a factor of three and also equally reduces the deflection which would occur at the outer faces of the cell at points of load application for the same reason.

Elements 19 are advantageously made of a material having a lower modulus than the end blocks 17 and 18 because it is desired to obtain a relatively large surface strain at the curved faces of element 19 on which strain gages 20 are mounted. Also, since tungsten carbide is a difficult material to work, it is advantageous to make the sensing elements 19 out of material which can readily be machined and later heat treated and brazed to the elements 17 and 18.

In the embodiment shown in Fig. 3 the sensing elements 19 are made rectangular in horizontal cross section as a matter of convenience with all four faces sharply curved, for example, as with a 1/16" radius, so as to produce a high stress concentration at the faces in the same manner as in Fig. 1. Thus the width of the sensing element 19 is specifically shown at about three times its height which gives a definite block characteristic to the element. These elements could just as well have been spooled-shaped so far as function is concerned but their relative height and width block features would be about the same. However, a square or rectangular cross section with curved faces makes it a great deal easier to apply the bonded wire strain gages since the gages are then curved in only one direction. It can be seen, from consideration of the action of such a block-like element as 19, that under the action of an axial load the axial stresses across the entire area at any section taken perpendicular to the axis are all of the same sign; i. e., if the axial load is compressive, all the stresses found in a transverse section of the block are of the sign associated in the compressive stress, while a tension load will cause all of the stresses to change sign to that of tension. Grooves 21, 22 are provided for attaching the load cell to its load receiving and base members. Alternatively, threaded holes or other suitable connecting means can be provided at the ends of the cell by suitably molding the tungsten carbide before it is sintered.

The 20,000 pound cell of Fig. 3, like that of Fig. 1, was not designed for minimum dimensions since extreme rigidity and ruggedness were the prime considerations. Nevertheless, the diameter and height were only 3". Where less stringent requirements apply, it is easily seen that this cell could be reduced greatly in overall dimensions without reducing its effectiveness as a precise measuring device of high rigidity.

Considering now the resistance of the load cells described here to eccentricity of loading and side loading, examination of Figs. 1 and 3 make it at once evident that the spaced arrangement of the load-transmitting elements provides an excellent means for resisting eccentric loading. At the same time, if all of the load-transmitting elements are provided with strain sensing means which are so connected into the measuring circuit that the algebraic sum of the loads on the individual transmitting elements is measured, then it is clear that the response of the load cell is substantially unaffected as a result of eccentricity of loading. As a matter of fact, I have demonstrated that in the case of the load cell of Fig. 1 the load may be so eccentric that it is applied directly over any one of the sensing elements and the effect on output was only a fraction of a percent different from that produced when the load was applied in the true axis of the cell, despite the fact that no particular pains were taken to equalize the sensitivities of the various strain gages applied to the several transmitting elements.

Coming now to consideration of the resistance to side force or shear of the load cells disclosed herein, it may be seen that I have deliberately provided load-transmitting elements which are in the form of blocks which are capable of transmitting shear forces without undergoing bending action. Had I instead employed the conventional columns as load-transmitting members I would have a construction which is inherently weak in shear-transmitting qualities because the columns would be subjected to bending in addition to the shear. This disadvantage could only be overcome by reinforcing the cell against transverse forces by some such means as stay plates or diaphragms as commonly used in conventional column-type load cells such as shown in my said patent. This, therefore, is an important advantage of the present invention and represents a fundamental distinction over the art. No additional structure whatever is required in order to make the cell resist all of the forces it may be called upon to carry. Thus, not only will the construction resist eccentric loading and transverse shear loading, but also it is equally able to resist large torsional loading which manifests itself in the form of shear at the load-transmitting elements. This last consideration makes the cell particularly well adapted for measuring screw-down loads in rolling mills where the screw transmitting load to the rolling mill bearing transmits its load through the load cell to the bearing. When the screw is turned under load, large torsional forces are produced even under lubricated conditions, a situation requiring special treatment with conventional cells. With this load cell, however, no additional structure is necessary to take care of the turning of the screw.

Referring again to Fig. 1, I have found that the piece can be machined very rapidly in the form shown by means of drills and milling cutters available in any modern machine shop. The machining of the piece can be somewhat simplified by cutting the hole 5 up through the bottom of the cell although such hole is not necessary and can well be omitted where maximum rigidity is required. Another simple and very practical way for making this cell is to cast it out of suitable elastic material. It has been found that beryllium copper cast and heat treated gives excellent results for this type of service and in some cases the gain in economy over an all-machined product is considerable.

While in Figs. 1 and 3 I have shown the load-transmitting elements as symmetrically spaced about the lengthwise axis of the load cell, this is not a necessary condition, although it is generally desirable. As is well known, when using electrical sensing means such as resistance-wire strain gages the addition and/or averaging of the loads carried by the several elements is an easy matter. Furthermore, even in a symmetrical design the elements do not have to be spaced around in a single circle to be effective—I might in Fig. 4, for example, space elements located at 19', 19' farther apart than the elements located at 20', 20' and still retain symmetry if I desire. I might also add an element at 29. In fact, any spacing and arrangement can be used to suit the limitations of practical design in any particular case.

It is also noteworthy that while I have shown the load-transmitting elements as being lined up in a plane which is at right angles to the lengthwise axis of the cell this is not a necessary condition but rather one of practical convenience in most cases. It is clear that the load-transmitting members can just as well lie in different horizontal planes so far as function is concerned. Also, if they are suitably anchored to the end members they can be inclined to the lengthwise axis of the cell, either in a symmetrical fashion or unsymmetrical, as conditions dictate.

Again referring to Fig. 3, which is a preferred embodiment of my invention, it will be seen that the elements 19 are provided with end members 23 and 24 larger in area transverse to the axis of the element 19 than the largest transverse area thereof on which the gages are mounted. I also prefer to make members 23 and 24 integral with the interposed element 19, although this is not essential; in fact, the load-transmitting elements can themselves be of composite construction, with members 23 and 24 being made of a different material from member 19 if desired. Any one of the load-transmitting and sensing blocks 19 can be considered by itself within the spirit of this disclosure in combination with its own load-receiving member 23 and base member 24 as constituting a "load-sensing device." Or, the entire assembly of Fig. 3 can be considered as such a "load-sensing device" in which one or more load-transmitting and sensing blocks 19 used in combination with load-receiving members 17 and 23 taken together and base members 18 and 24 taken together comprise the "device."

There is considerable significance to the end members 23, 24 in that they perform an important function in helping to achieve the precision of which the device is capable. Due to the so-called Poisson effect, when a lengthwise or axial load is applied to the load-sensitive element 19 it tries to expand somewhat laterally. In a composite construction such as that of Fig. 3 the Poisson effect could easily give rise to inelastic action since there might be slippage between the load-sensing element and the main blocks of the load cell. By making end members 23, 24 larger in area than the area of the sensing element 19 between them I substantially reduce the possibility of such slippage even though only abutting contact exists between combined elements 19, 23, 24 and the main blocks 17, 18 of the cell.

Furthermore, if I braze, weld, or othhewise cement end members 23, 24 to blocks 17, 18 only a small shear stress is required to totally prevent slippage due to the large area I have provided relative to that of the interposed measuring element.

The shape or configuration of end members 23, 24 is shown as circular in Fig. 3 since that is a convenient way to make them if turned in a lathe. However, they can be of any other shape to suit the designer.

The load-sensing element of members 19 of Fig. 3 can also be of any convenient shape, considering a plane transverse to the lengthwise axis of the element. For example, a circular or oblong cross section may be desirable in some applications, the circular element resulting in a simple spool shape for the entire member 19 which is easily turned in a lathe. In Fig. 5, I show an element which is rectangular in a plane transverse to its lengthwise axis 25 and, for convenience, is shown with rectangular end members 26, 27. The interposed load-transmitting member 28 is preferably curved for stress concentration along its longer faces, although it may be so shaped on all faces if desired.

The advantage of an element of this type is that it can have a very high shear strength in one direction while having a relatively small cross sectional area at the point of strain measurement, thus resulting in a high sensitivity of the load, while still providing a relatively large surface for application of the strain gages 30. Thus, to increase the load sensitivity of the design shown in Fig. 3 without losing its high resistance to transverse and torsional loads and its convenient gaging surfaces the elements at location 19', 19', Fig. 4, would preferably be replaced by elements of the Fig. 5 design oriented as shown in this top view thereof, and elements at location 20', 20' would be replaced by elements of the Fig. 5 design oriented at 90 degrees to the top view of Fig. 5. In this way, the structure of Fig. 3 would present a great resistance to shear in either horizontal direction and a great resistance to torque about the lengthwise axis, while at the same time the load transmitting element 28 can be designed to be more highly stressed by a given axial load than would be the case with the square element 19 of Fig. 3 while still providing convenient surfaces for mounting the strain gages. This and other variations in the application of my invention can readily be made by those skilled in the art without departing from the spirit of the invention as set forth in the claims hereof.

It will of course be understood that various changes may be made in the details of the construction disclosed herein without departing from the spirit of my invention.

I claim:

1. A load-sensing device having a lengthwise axis along which load is to be applied, comprising load-receiving means and base means for supporting the load to be measured, load-transmitting means interposed therebetween including a block of elastic material whose height measured in the axial direction is smaller than at least one of its dimensions transverse to said axial direction and whose area in any transverse section is such that the axial stresses at such section are of the same sign over the entire section when the block is subjected to an axial load, said block having at least a part of its surface that extends in a lengthwise direction shaped to a concave curve so as to create at said surface a lengthwise stress concentration which is higher than the average lengthwise stress carried by said block and higher than the circumferential stress, and electrical sensing means extending lengthwise of the block and being responsive to the lengthwise strain on said curved surface resulting from said stress concentration, thereby to sense the load acting on said element with greater sensitivity than would result from measurement of the average lengthwise strain throughout the block, whereby a high degree of shear loading transverse to the axis may occur in addition to axial load without failure due to bending action of the block.

2. The combination set forth in claim 1 further characterized in that said concave curve of the block has the form of an arc of a circle at its intersection with a plane containing the axis.

3. The combination set forth in claim 1 further characterized in that the concave curve is formed as a complete semi-circular curve with its upper and lower portions tangent to planes extending transverse of said axis of the device.

4. The combination set forth in claim 1 further characterized in that there are at least two of said load-transmitting means spaced laterally from each other and formed integrally with the load receiving and base means.

5. The combination set forth in claim 1 further characterized in that the block has upper and lower flanges extending transversely of said axis beyond the concave surface of the block, whereby said flanges provide a large area for said load receiving and base means.

6. The combination set forth in claim 1 further characterized in that the load receiving and base means are made of a material having a higher modulus of elasticity than that of the block at least in the region immediately adjacent to the block.

7. The combination set forth in claim 1 further characterized in that the load receiving and base means are of tungsten carbide adjacent the block which is formed of material having a lower modulus of elasticity than the tungsten carbide.

8. The combination set forth in claim 1 further characterized in that there are at least two of said blocks spaced laterally of each other and each block having upper and lower flanges extending transversely of said axis beyond the concave surface of the block, said blocks being separate from but having abutting engagement with said base means and with said load transmitting means so that said load is shared between said blocks.

9. A load-sensing device having a lengthwise axis along which load is to be applied, comprising load-receiving means and base means for supporting the load to be measured, load-transmitting means interposed therebetween including a block of elastic material whose height measured in the axial direction is smaller than at least one of its dimensions transverse to said axial direction and whose area in any transverse section is such that the axial stresses at such section are of the same sign over the entire section when the block is subjected to an axial load, said block having at least a part of its surface that extends in a lengthwise direction shaped to a concave curve so as to create at said surface a lengthwise stress concentration which is higher than the average lengthwise stress carried by said block and higher than the circumferential stress, and electrical sensing means extending lengthwise of the block and being responsive to the relative axial movement between said load receiving means and said base means.

References Cited in the file of this patent

UNITED STATES PATENTS

| 2,447,854 | Baker | Aug. 2, 1949 |
| 2,488,348 | Ruge | Nov. 15, 1949 |
| 2,493,029 | Ramberg | Jan. 3, 1950 |

FOREIGN PATENTS

| 645,845 | Great Britain | Nov. 8, 1950 |